United States Patent [19]
Lee

[11] Patent Number: 5,789,895
[45] Date of Patent: Aug. 4, 1998

[54] BEMF CROSSING DETECTION IN PWM MODE OPERATION FOR SENSORLESS MOTOR CONTROL APPLICATION

[75] Inventor: Eugene C. Lee, Cupertino, Calif.

[73] Assignee: SGS-Thomson Microelectronics Inc., Carrollton, Tex.

[21] Appl. No.: 764,782

[22] Filed: Dec. 12, 1996

[51] Int. Cl.$^6$ ......................................................... H02P 5/28
[52] U.S. Cl. .......................... 318/811; 318/254; 318/439; 318/138; 388/928.1
[58] Field of Search .................................. 318/254, 439, 318/138, 801–811, 459; 388/928.1

[56] References Cited

U.S. PATENT DOCUMENTS

| | | | |
|---|---|---|---|
| 4,642,537 | 2/1987 | Young | 318/254 |
| 5,017,845 | 5/1991 | Carobolante et al. | 318/138 |
| 5,172,036 | 12/1992 | Cameron | 318/138 |
| 5,198,733 | 3/1993 | Wright | 18/254 |
| 5,221,881 | 6/1993 | Cameron | 318/254 |
| 5,245,256 | 9/1993 | Cassat et al. | 318/254 |
| 5,285,135 | 2/1994 | Carobolante et al. | 318/254 |
| 5,294,877 | 3/1994 | Cameron | 318/809 |
| 5,306,988 | 4/1994 | Carobolante et al. | 318/254 |
| 5,317,243 | 5/1994 | Cameron | 318/254 |
| 5,350,984 | 9/1994 | Carobolante et al. | 318/254 |
| 5,434,492 | 7/1995 | Hilaire et al. | 318/717 |
| 5,506,487 | 4/1996 | Young et al. | 318/811 |
| 5,517,095 | 5/1996 | Carobolante et al. | 318/138 X |

OTHER PUBLICATIONS

Arefeen et al., "Elimination of Discrete Position Sensor for Synchronous Reluctance Motor," in *PESC'93 Record of the 24th Annual IEEE Power Electronics Specialists Conference*, Seattle, WA, Jun. 20–25, 1993, pp. 440–445.
SGS-Thomson Microelectronics, "12 V Sensorless Spindle Motor Controller," bearing an internal date of Dec. 7, 1994, but publicly disclosed later.

*Primary Examiner*—Brian Sircus
*Attorney, Agent, or Firm*—David V. Carlson; Theodore E. Galanthay; Lisa K. Jorgenson

[57] ABSTRACT

A method and a circuit for detecting zero crossing points for a brushless, sensorless, three-phase DC motor operated in a PWM mode. The circuit senses a BEMF signal in a floating coil and generates a first signal when the BEMF signal is separated from the center tap voltage by a selected offset voltage amount. The circuit overrides the PWM mode and drives a high side driving transistor to a conducting state until the zero crossing point is detected.

14 Claims, 3 Drawing Sheets

5,789,895

1

BEMF CROSSING DETECTION IN PWM MODE OPERATION FOR SENSORLESS MOTOR CONTROL APPLICATION

TECHNICAL FIELD

This invention relates to the operation of a polyphase DC motor, and more particularly, to a method and a circuit for detecting BEMF zero crossing points during the operation of a polyphase DC motor in a PWM mode.

BACKGROUND OF THE INVENTION

Polyphase DC motors, and more particularly three-phase DC motors of the brushless, sensorless type, are widely used in computer system disk drives, such as floppy disk, hard disk, or CD ROM drives, as well as in other applications. Three-phase DC motors may be modeled as having a stator with three coils connected in a "Y" configuration, although typically a larger number of stator coils are employed with multiple motor poles. In conventional applications, eight pole motors are used having twelve stator windings and four N-S magnetic sets on a rotor, resulting in four electrical cycles per revolution of the rotor. The twelve stator windings, or coils, are modeled as four groups of coils, each group being arranged as a set of three "Y" connected coils. Each of the three coils in the "Y" configuration is joined at one end to a common node, or a center tap, and the opposite end of each coil is connected between a high side driving transistor and a low side driving transistor. The driving transistors are typically n-channel MOS transistors, although other types of transistors may be used. The center tap may be left unconnected, or it may be connected to a controlled voltage source.

A three-phase DC motor is typically operated in a bipolar mode which can be summarized as follows. The three "Y" connected coils are energized in a sequence of pathways of current flow to drive the rotor. In each, a current path is established through two of the three coils. The third coil in the "Y" configuration is left floating, or, in other words, no current is permitted to flow through the coil.

Current flow through the coils is controlled using the driving transistors. Current flows through a conducting high side driving transistor and its associated coil, through the center tap, and then through a second coil and its conducting low side driving transistor. The sequence of current pathways is chosen so that, as the current path is changed, one of the coils in the current path is switched to a floating condition, and the previously floating coil is switched into the current path. In the "Y" configuration of three coils a total of six different current paths are available to drive the rotor. The sequence is arranged such that when a previously floating coil is switched into a current path, the current flowing in the previously conducting coil will flow in the same direction in the newly conducting coil.

A commutation occurs each time the current path in the coils is changed and the position of the rotor at that moment is a commutation point. In the sequence defined above, six different commutation events occur for each electrical cycle in the three-phase DC motor. One electrical cycle corresponds to one full rotation of the rotor.

Careful control of the rotational motion of the rotor in the three-phase DC motor is important for accurate control of read and write operations in disk drive systems. Inadequate control of the rotor's motion can result in unwanted vibration, acoustic noise or a loss of data. The motion of the rotor is controlled by choosing the commutation points in a precise and consistent manner. An optimum commutation point is selected based on the position of the rotor, which is typically ascertained by monitoring a back EMF signal in the motor, also called the BEMF signal, which is the EMF induced in the floating coil by the rotating magnetic field of the rotor.

The BEMF signal in the floating coil is sinusoidal in nature, and crosses the voltage of the center tap at regular intervals. A typical BEMF signal is shown in FIG. 1. The BEMF signal may be used to determine the rotational speed of the rotor. As the rotor speed increases, the period of the BEMF signal decreases. As the rotor speed decreases, the period of the BEMF signal increases. The BEMF voltage signal is also used to select the commutation points. Conventionally, optimum commutation points are chosen in relation to the moments in which the BEMF signal crosses the center tap voltage, and these moments are zero crossing points. With reference to FIG. 1, a BEMF signal is shown as a sine wave that crosses the center tap voltage; and two zero crossing points are identified. When the motor is functioning properly the exact position of the rotor is known at each zero crossing point.

Three-phase DC motors are generally run in one of two modes. In a linear mode of operation the high side driving transistor is maintained in a conducting state, or, in other words is switched on, continuously until the current pathway is changed in a commutation. In a pulse width modulation, or PWM mode, the selected high side driving transistor is pulsed on and off by a PWM signal applied to a gate of the high side driving transistor. One disadvantage of the linear mode of the operation is that, as the capacity of disk drives and the size of disks increases, the power dissipated becomes excessive. In contrast, the PWM mode of operation dissipates much less power. Increasingly, the PWM mode of operation is being used during a start-up of the motor and during a regulation mode when the speed of the rotating motor is merely being maintained by the coils.

In the linear mode of operation the BEMF and center tap voltage signals are continuous signals because the high side driving transistor is never turned off. A detection of a zero crossing point during the linear mode of operation may therefore be performed easily, consistently, and precisely. In the PWM mode of operation, the high side driving transistor is turned on and off at regular intervals, and at a relatively high frequency. The center tap voltage disappears when the high side driving transistor is turned off, and therefore the zero crossing point is not available during these periods. The pulsing of the high side driving transistor also introduces voltage spikes which are transient disruptions in the BEMF signal that can contribute to false detections of zero crossing points. It is consequently more difficult to detect the zero crossing points when the motor is being operated in the PWM mode. Errors in the detection of the zero crossing points lead to errors in the selection of the commutation points and result in unwanted vibration and acoustic noise during the operation of the motor.

A conventional method of detecting the zero crossing points for a three-phase DC motor employs a single comparator to compare the BEMF signal with the center tap voltage and generate a zero crossing signal when the two signals meet. This method is inadequate for a motor operating in a PWM mode because the center tap voltage is not continuously present and zero crossing points are periodically missed. The conventional method has been improved by sampling the BEMF signal and the center tap voltage when the high side driving transistor is being turned off. Errors occur in the improved method because there is a maximum detection window uncertainty equal to one period of the PWM signal. A second known method for detecting the zero crossing points for a motor operated in the PWM mode involves switching from the PWM mode to a linear mode of operation just before the zero crossing point occurs so that the zero crossing point can be cleanly detected. The problem with this method is that the PWM mode of operation is primarily a digital one while the linear mode of operation is primarily an analog one, and consequently it is difficult to switch between the modes quickly enough such that an accurate detection of a zero crossing point may be made while the advantages of the PWM mode of operation are retained. The need remains for a method and a circuit for consistently and reliably detecting the zero crossing points for a polyphase DC motor operated in a PWM mode.

SUMMARY OF THE INVENTION

According to principles of the present invention, a zero crossing point in a BEMF signal is detected by a circuit. The circuit includes a first comparing circuit having a first input, a second input, an output, and which receives an offset signal equal to a selected offset voltage amount. The first input is connected to a center tap voltage, and the second input is connected to a BEMF signal. A first signal is generated at the output of the first comparing circuit when the difference between the BEMF signal and the center tap voltage is less than the selected offset voltage amount. A second comparing circuit having a third input, a fourth input, and an output is enabled when the first signal is generated. The third input is connected to the center tap voltage and the fourth input is connected to the BEMF signal such that the second comparing circuit generates a zero crossing signal when the BEMF signal equals the center tap voltage.

The present invention operates by comparing the BEMF signal in a floating coil of the motor to a center tap voltage. The first signal is generated when the difference between the BEMF signal and the center tap voltage is less than the selected offset voltage amount. The first signal enables the zero crossing detector to sense the actual zero crossing. It also ensures that power is being provided to the coils when the zero crossing is being sensed. A zero crossing signal is generated when the BEMF signal equals the center tap voltage.

DETAILED DESCRIPTION OF THE INVENTION

Figure 1:
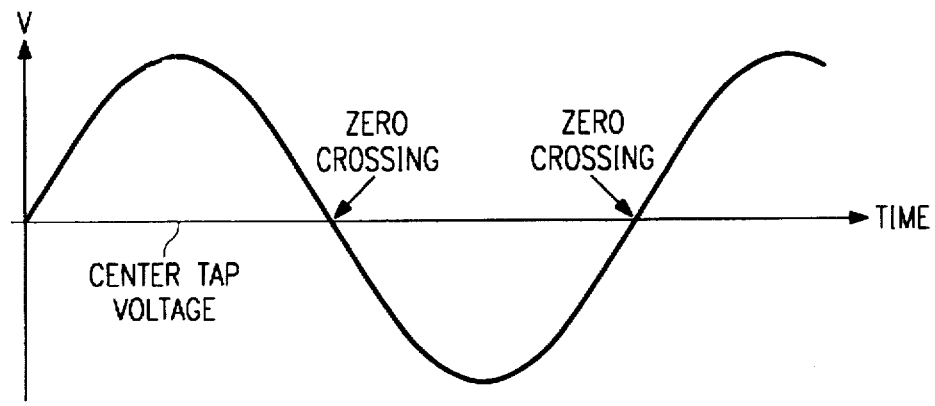
FIG. 1 is a plot of a back EMF voltage signal and a center tap voltage generated in a conventional three-phase DC motor.
Figure 2:
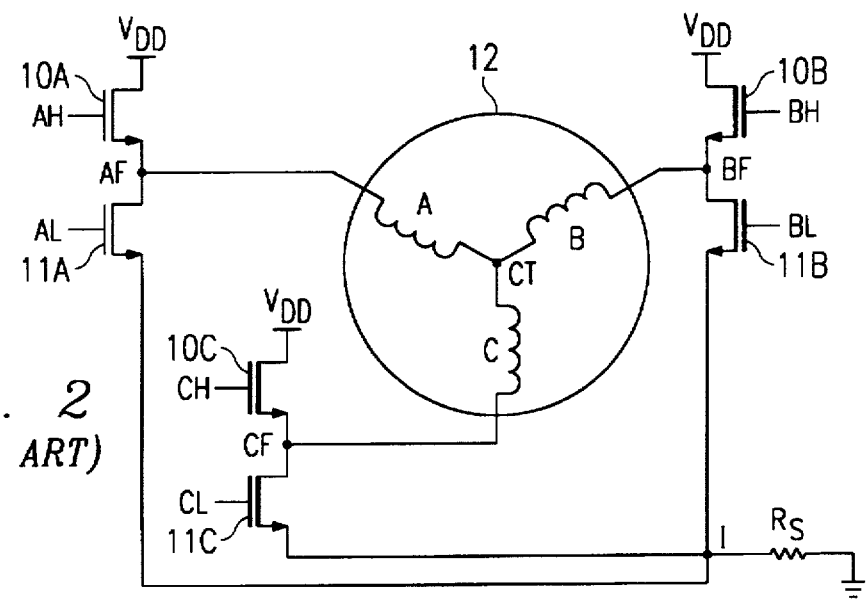
FIG. 2 is an electrical schematic diagram of a three-phase DC motor according to the prior art.

A typical three-phase "Y" connected motor is shown schematically in FIG. 2. With reference to FIG. 2, three coils of the motor are identified by the letters A, B and C. A center tap end of each of the coils is connected at a center tap CT. A rotor is shown schematically by a circle 12. The figures are not drawn to scale and it will be appreciated that the coils A, B and C are usually positioned on a stator which surrounds the rotor, with the rotor having at least one N-S magnetic set attachment thereto inside the coils; such rotor and coil assemblies are well known in the art.

Each coil is driven by a pair of n-channel lateral DMOS driving transistors, a first end of each coil being connected between a high side driving transistor and a low side driving transistor. A first end of the coil A, denoted as AF, is connected to the source of a high side driving transistor 10A and to the drain of a low side driving transistor 11A. A first end of the coil B, denoted as BF, is similarly connected to the source of a high side driving transistor 10B and to the drain of a low side driving transistor 11B. Finally, a first end of the coil C, denoted as CF, is connected to the source of a high side driving transistor 10C and to the drain of a low side driving transistor 11C. The drains of each of the high side driving transistors 10A, 10B and 10C are connected to a voltage source VDD, and the sources of each of the low side driving transistors 11A, 11B and 11C are connected to a first end I of a sense resistor $R_s$. A second end of the sense resistor $R_s$ is connected to a ground voltage reference. The connection of the sense resistor $R_s$ to the sources of each of the low side driving transistors ensures that all of the current flowing through the coils will pass through the sense resistor $R_s$ before returning to ground. The voltage drop across the sense resistor $R_s$ is a measure of the current flowing in the coils.

The gates of the high side and low side driving transistors are driven by a set of control signals generated by a motor control logic circuit. The gate of the high side driving transistor 10A is driven by a control signal AH. The gate of the low side driving transistor 11A is driven by a control signal AL. The gate of the high side driving transistor 10B is driven by a control signal BH, and the gate of the low side driving transistor 11B is driven by a control signal BL. The gate of the high side driving transistor 10C is driven by a control signal CH, and the gate of the low side driving transistor 11C is driven by a control signal CL. The gates of the driving transistors are selectively energized by the motor control logic circuit through the control signals AH, AL, BH, BL, CH, and CL to control the path of current flowing through the coils. When a gate of one of the driving transistors is energized to a high voltage level, the driving transistor will conduct current and become part of the current path in the motor. For example, in a representative phase of operation, current flows from coil A to coil B by flowing from the voltage source VDD, through the high side driving transistor 10A, through the coil A, the center tap CT, the coil B, and then through the low side driving transistor 11B and the sense resistor $R_s$ to the ground voltage reference. This particular phase is chosen by the motor control logic circuit by taking the AH and BL control signals high to energize the driving transistors 11A and 11B while leaving the other four control signals low. A commutation is carried out by the motor control logic circuit which, at the appropriate moment, pulls one of the control signals low and simultaneously drives another of the control signals high.

When the three-phase DC motor is operated in the bipolar mode, the coils A, B and C are energized according to a sequence of phases of current flow, each phase being defined by a current path through two of the three coils with the third coil left floating. A first phase has been described above in which the driving transistors 10A and 11B are energized to create a current path. Six alternate phases of current flow are possible for the "Y" configuration of coils, and the six phases are employed in a sequence to start and maintain the rotation of the rotor. The sequence of phases is arranged so that, as each commutation occurs, one of the coils in the current path is switched to a floating condition, and the previously floating coil is switched into the current path. Moreover, the sequence is chosen such that when the floating coil is switched into the current path, it replaces one of the conducting coils such that current flows in the newly conducting coil in the same direction as it had in the formerly conducting coil. For example, if current is flowing through the high side driving transistor 10A to the coil A, and the coil A is replaced by the coil B, current will then flow from the high side driving transistor 10B to the coil B.

Figure 3:
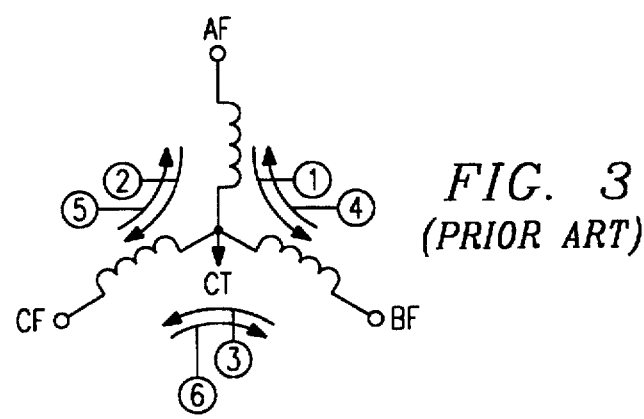
FIG. 3 is an electrical schematic diagram of a "Y" connected rotor coil arrangement according to the prior art, illustrating the current flow direction for each of six phases.

One full rotation of the rotor represents a complete electrical cycle in which the rotor is driven by the entire sequence of six phases. The six phases are shown in Table A and illustrated in FIG. 3. With reference to FIG. 3, the three coils A, B and C are connected in the "Y" configuration and the six current paths are labeled with six arrows numbered 1–6. Each arrow corresponds to a phase which is detailed in Table A.

TABLE A

| Phase | Current Flows From: | To: | Floating Coil |
| --- | --- | --- | --- |
| 1 | A | B | C |
| 2 | A | C | B |
| 3 | B | C | A |
| 4 | B | A | C |
| 5 | C | A | B |
| 6 | C | B | A |

In the first phase current flows from the coil A to the coil B as shown by the arrow 1, and the coil C is floating. In the second phase, current flows from the coil A to the coil C according to the arrow 2, and the coil B is floating. The current flowing through the coil A in phase 1 is also flowing in the coil A in phase 2, whereas the floating coil has been switched from the coil C to the coil B. The rest of the phases follow similarly according to the table and the arrows shown in FIG. 3.

Methods for operating three-phase DC motors are well known, and several examples are contained in U.S. Pat. Nos. 5,221,881; 5,294,877; 5,306,988; and 5,317,243. In an alternative embodiment, the three-phase DC motor may be operated with a sequence of three phases rather than six phases.

Figure 4:
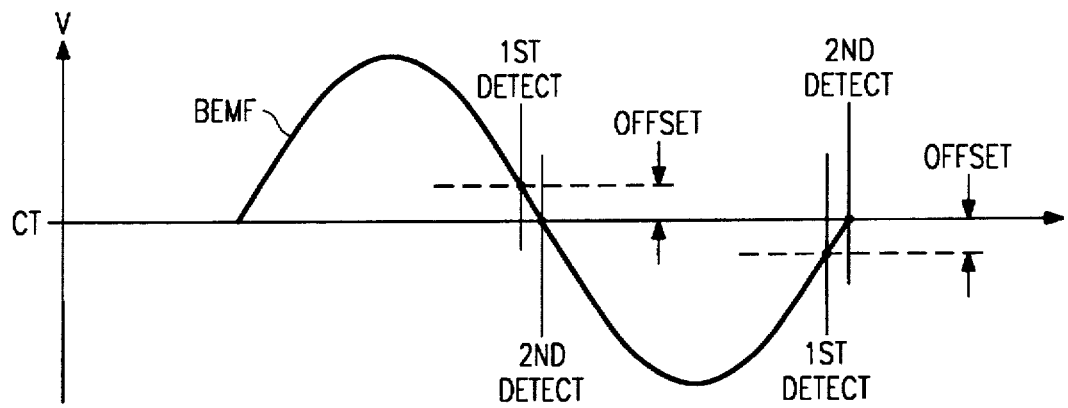
FIG. 4 is a plot of a back EMF signal and an illustration of a method for detecting zero crossing points according to an embodiment of the invention.

A method according to an embodiment of the invention will now be described. With reference to FIG. 4, a full sinusoidal BEMF signal from a floating coil is shown oscillating about a center tap voltage. The period of time in which the motor is being operated in one phase is very short, and therefore only a portion of the sinusoid actually exists in the floating coil during any single phase. According to the method, a first signal is generated when the difference between the BEMF signal and the center tap voltage is less than or equal to a selected offset voltage amount. The first signal indicates that the BEMF signal is approaching the center tap voltage and that a zero crossing point is imminent. In response to the first signal the PWM mode is overridden and the gate of a selected high side driving transistor is held at a high voltage until the actual zero crossing point is detected. When the BEMF signal equals the center tap voltage, a zero crossing signal is generated to indicate the occurrence of the zero crossing point, and the zero crossing signal is fed to the motor control logic circuit. The selected high side driving transistor is maintained in a conducting state during the time period leading up to the zero crossing point and at the zero crossing point for the following reason: if the gate of the high side driving transistor were to be shut off, a voltage spike would occur in the BEMF signal which could cause an erroneous detection of the zero crossing point. Once the zero crossing point is detected the PWM mode is resumed and the PWM signal is then applied to the gate of the selected high side driving transistor.

Figure 4A:
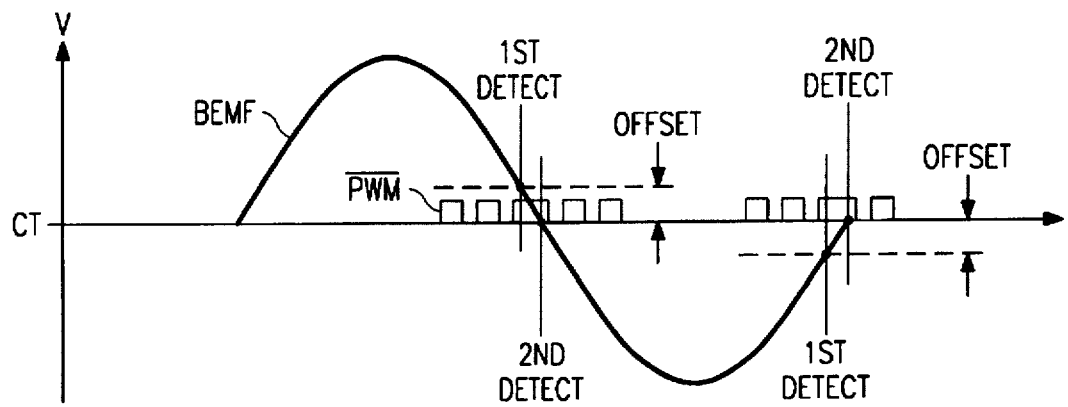
FIG. 4A is a plot of a back EMF signal and an illustration of a method for detecting zero crossing points by overriding a PWM signal until a zero crossing point is detected according to an embodiment of the invention.

The method is further detailed in FIG. 4A where a $\overline{PWM}$ signal is shown with the BEMF signal. The $\overline{PWM}$ signal is an inverted PWM signal. The $\overline{PWM}$ signal and the BEMF signal are not drawn to scale and are illustrated only to demonstrate the method according to an embodiment of the invention. The $\overline{PWM}$ signal is comprised of a square wave having a duty cycle. A selected high side driving transistor is switched on at a rising edge of a $\overline{PWM}$ signal and is switched off at a falling edge of the $\overline{PWM}$ signal. As demonstrated in FIG. 4A and according to the method, the $\overline{PWM}$ signal is overridden after the first signal is generated and a high voltage level drives the selected high side driving transistor to maintain it in a conducting state. When the zero crossing point is detected the $\overline{PWM}$ signal is once again applied to drive the selected high side driving transistor.

Figure 5:
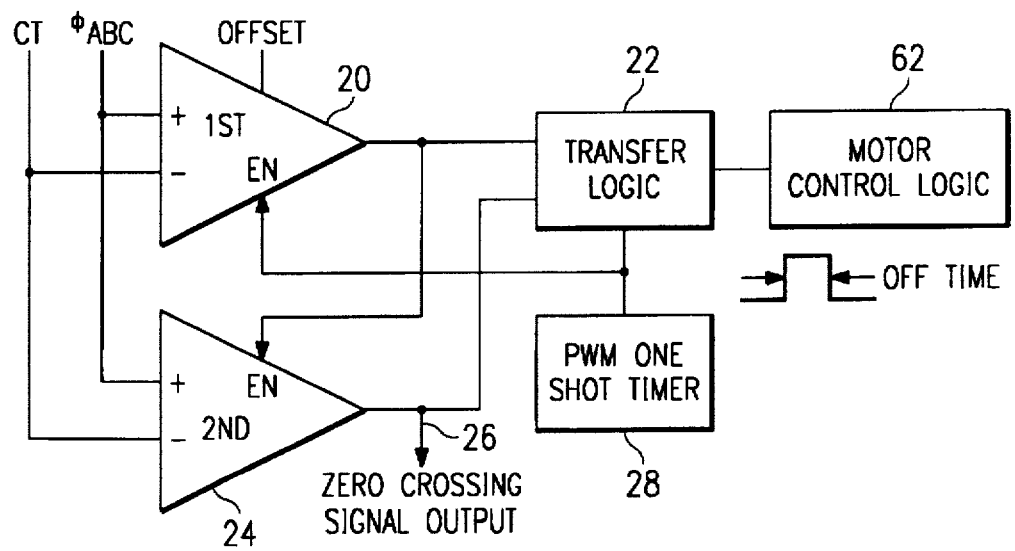
FIG. 5 is an electrical schematic diagram of a circuit for detecting zero crossing points according to an embodiment of the invention.

A circuit according to an embodiment of the invention will now be described with reference to FIG. 5. A first comparing circuit 20 has a non-inverting input, an inverting input, and an output. The first comparing circuit 20 also receives a programmable offset signal OFFSET, and has an enabling input EN. The output of the first comparing circuit 20 is connected to a first input of a transfer logic circuit 22. A second comparing circuit 24 has a non-inverting input, an inverting input, and an output. The second comparing circuit 24 also has an enabling input EN which is connected to the output of the first comparing circuit 20. The output of the second comparing circuit 24 is connected to a second input of the transfer logic circuit 22 and to a zero crossing signal output line 26. A PWM one-shot timer circuit 28 generates a square wave PWM signal having a duty cycle. The PWM signal is received at the enabling input EN of the first comparing circuit 20 and by the transfer logic circuit 22. An output of the transfer logic circuit 22 is connected to a motor control logic circuit 62 which controls a set of driving transistors in a three-phase DC motor.

The inverting inputs of each of the comparing circuits 20 and 24 are connected to a center tap CT of the motor. The non-inverting inputs of each of the comparing circuits 20 and 24 are connected to a $\Phi_{ABC}$ line. The $\Phi_{ABC}$ line is connected to the floating coil in each phase of operation of the motor and receives the BEMF signal generated by the motor.

The operation of the circuit shown in FIG. 5 will now be described. The PWM one-shot timer 28 generates a square wave PWM signal having a duty cycle. An offset voltage amount is provided to the first comparing circuit 20 by the signal OFFSET. When the BEMF signal delivered by the $\Phi_{ABC}$ line is separated from the voltage at the center tap CT by more than the offset voltage amount, the transfer logic circuit 22 inverts the PWM signal and delivers the inverted PWM signal to the motor control logic circuit 62. The motor control logic circuit 62 energizes a selected high side driving transistor according to the inverted PWM signal to operate the selected high side driving transistor in the PWM mode. When the PWM signal has a falling edge the selected high side driving transistor is being switched on and when the PWM signal has a rising edge the transistor is being switched off.

The first comparing circuit 20 is enabled by the rising edge of the PWM signal, when the selected high side driving transistor is being switched off, to make a sample comparison between the BEMF signal and the center tap voltage. The comparison is made at this moment because the selected high side driving transistor has been conducting for a substantial period of time, and any voltage spikes generated when the transistor was switched on have dissipated by the time the transistor is switched off. When the difference between the BEMF signal and the voltage at the center tap CT is less than the offset amount, a first signal is generated at the output of the first comparing circuit which is received by the transfer logic circuit 22. Upon receipt of the first signal, the transfer logic circuit 22 overrides the PWM signal and delivers a high signal to the motor control logic circuit 62 to maintain the selected high side driving transistor in a conducting state. The generation of the first signal indicates that a zero crossing point is imminent, and in response the second comparing circuit 24 is enabled to compare the BEMF signal with the voltage at the center tap CT. At the zero crossing point the BEMF signal equals the voltage at the center tap CT and the second comparing circuit 24 generates a second signal at its output. The second signal is received by the transfer logic circuit 22 and is delivered to the zero crossing signal output line 26 which is connected to various well-known circuits for controlling a DC motor.

Upon the generation of the second signal the transfer logic circuit 22 restores the delivery of the inverted PWM signal to the motor control logic circuit 62 to drive the selected high side driving transistor in the PWM mode. As discussed above, the selected high side driving transistor is maintained in a conducting state in the period between the generation of the first signal and the zero crossing point to prevent a voltage spike from disrupting the detection of the zero crossing point.

A circuit according to another embodiment of the invention will now be described with reference to FIG. 6. Beginning at the left hand side of the circuit, a center tap voltage is delivered to the circuit directly from the center tap CT by a CT line, and a BEMF signal is delivered to the circuit by a line $\Phi_{ABC}$. The $\Phi_{ABC}$ line is connected to the floating coil. A first comparator 50 has a non-inverting input and an inverting input, and is connected to a programmable offset voltage line OFFSET. An offset voltage amount may be chosen using a programmable computer and delivered to the first comparator 50 by the OFFSET line. The offset voltage amount may be adjusted while the motor is operating in order to optimize the performance of the circuit. The first comparator 50 has an output coupled to a sample and hold circuit 52. The sample and hold circuit 52 includes an RS flip-flop circuit 54. The S input is connected to the R input of the RS flip-flop circuit 54 by an inverter 56. The output of the first comparator 50 is connected to a switch 58 which completes a connection to the S input of the RS flip-flop circuit 54 when the sample and hold circuit 52 is enabled.

The switch 58 may be comprised of a MOS transistor or a BJT transistor or any suitable switching device. The Q output of the RS flip-flop circuit 54 is connected to a first input of a two-input NAND gate 60. An output of the NAND gate 60 is connected to a motor control logic circuit 62. The motor control logic circuit 62 is identical to the similarly identified circuit shown in FIG. 5.

A second comparator 64 has a non-inverting input, an inverting input, and an output. The second comparator 64 also has an enabling input port $\overline{EN}$ which is connected to the Q output of the RS flip-flop circuit 54. The output of the second comparator 64 is connected to a $\overline{PS}$ input of the RS flip-flop circuit 54 and to a zero crossing signal output line 65.

Figure 6:
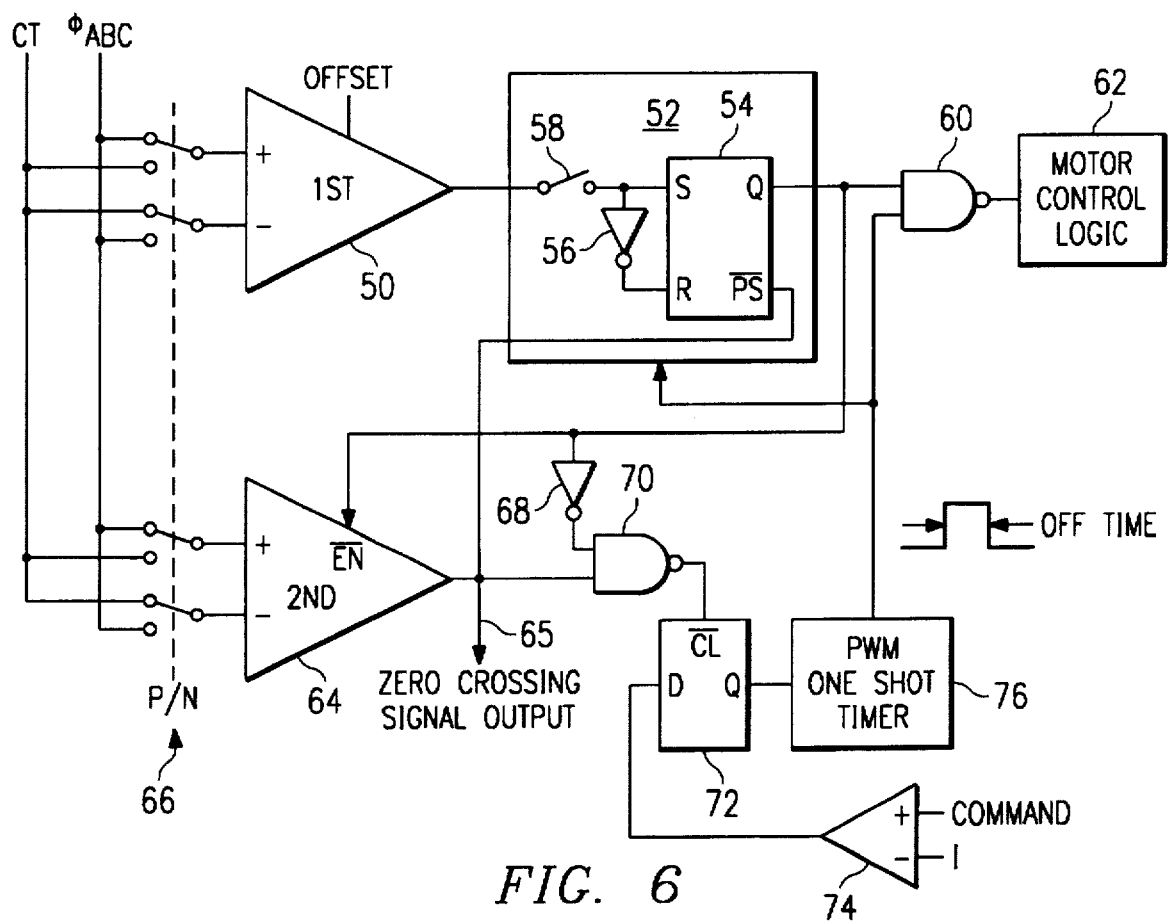
FIG. 6 is an electrical schematic diagram of a circuit for detecting zero crossing points according to an embodiment of the invention.

The non-inverting inputs of both the first comparator 50 and the second comparator 64 are selectively connected to either the CT line or the $\Phi_{ABC}$ line by a switch 66, shown schematically in FIG. 6. The switch 66 alternately connects the CT line or the $\Phi_{ABC}$ line to the non-inverting input of both comparators based on the value of a P/N signal delivered on a P/N line, and the remaining line is connected to the inverting input of both comparators. The switch 66 may be comprised of a MOS transistor or a BJT transistor or any suitable switching device. The P/N signal is derived from the slope of the BEMF signal. The P/N signal is high when the slope of the BEMF signal is positive and the BEMF signal is rising toward the center tap voltage and the zero crossing point. The P/N signal is low when the slope of the BEMF signal is negative, and the BEMF signal is falling toward the center tap voltage and the zero crossing point. When the P/N signal is high, the switch 66 connects the CT line to the non-inverting input of each of the comparators 50 and 64 and the $\Phi_{ABC}$ line to the inverting input of both comparators. When the P/N signal is low the switch 66 connects the $\Phi_{ABC}$ line to the non-inverting input of each of the comparators 50 and 64, and the CT line to the inverting input of both comparators. The purpose of the switch 66 is to ensure that the output of each of the comparators 50 and 64 will transition from high to low when the appropriate event occurs.

The Q output of the RS flip-flop circuit 54 is connected to an inverter 68, and an output of the inverter 68 is connected to a first input of a two-input NAND gate 70. The output of the second comparator 64 is connected to a second input of the NAND gate 70. An output of the NAND gate 70 is connected to a $\overline{CL}$ input of a D-type flip-flop circuit 72. The D input of the flip-flop circuit 72 is connected to an output of a third comparator 74.

The third comparator 74 is employed to regulate the rotational speed of the rotor. A non-inverting input of the third comparator 74 is connected to a command signal input COMMAND which is a voltage indicating the maximum speed of the rotor. The command signal may be generated by any well-known programmable logic circuit. An inverting input of the third comparator 74 is connected to the first end I of the sense resistor $R_s$, and, as described above, the voltage at the first end I indicates the amount of current flowing through the coils. The Q output of the flip-flop circuit 72 is connected to an input of a PWM one-shot timer circuit 76. An output of the PWM one-shot timer circuit 76 is connected to enable the sample and hold circuit 52, and is also connected to a second input of the NAND gate 60. The PWM one-shot timer circuit 76 generates a PWM signal at its output which is low while its input is held high. When the Q output of the flip-flop circuit goes low the PWM one-shot timer circuit 76 pulls the PWM signal high for a selected period of time, and resumes generating a low PWM signal at the end of this period.

Figure 7:
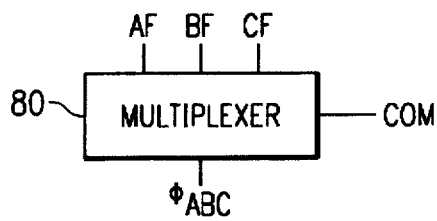
FIG. 7 is an electrical schematic diagram of a multiplexer circuit according to an embodiment of the invention.

The BEMF signal delivered by the $\Phi_{ABC}$ line is derived directly from the "Y" configuration of coils shown in FIG. 2. The first ends AF, BF, and CF of the coils carry the voltage in the respective coils A, B, and C. A multiplexer circuit 80, shown in FIG. 7, receives lines from each of the first ends AF, BF, and CF, and connects the first end of the floating coil to the $\Phi_{ABC}$ line during the appropriate intervals. As shown in Table A, the identity of the floating coil changes from the coil C to the coil B and then to the coil A during every half rotation of the rotor. The multiplexer circuit 80 selectively connects the $\Phi_{ABC}$ line to one of the first ends AF, BF, or CF based on the data in Table A and a COM signal input to the multiplexer circuit. A pulse is generated in the COM signal when a commutation takes place to indicate that the identity of the floating coil has changed. The multiplexer circuit connects the $\Phi_{ABC}$ line to the first end of the newly floating coil in response. The multiplexer circuit may be initialized based on the starting position of the rotor according to any known method.

Figure 8:
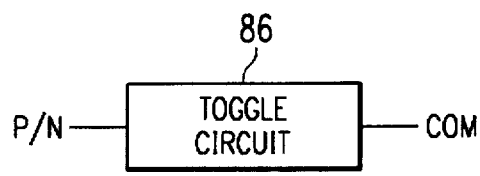
FIG. 8 is an electrical schematic diagram of a toggle circuit according to an embodiment of the invention.

As described above in relation to FIG. 6, the P/N signal is derived from the slope of the BEMF signal. The slope of the BEMF signal in the floating coil toggles between a positive slope and a negative slope at each commutation point. More significantly, the slope of the BEMF signal is known for each phase of the electrical cycle. The P/N signal can therefore be derived from a toggle circuit 86 shown in FIG. 8. The toggle circuit 86 receives the COM signal at an input and generates the P/N signal at an output. The P/N signal can be initialized based on the starting position of the rotor and the starting phase according to any known method. During operation of the motor the value of the P/N signal toggles at each commutation point as a pulse is received from the COM signal.

The rotational speed of the rotor is controlled by the PWM signal in the following manner. When the three-phase, "Y" connected motor is operating in the PWM mode and the BEMF signal is separated from the center tap voltage by more than the offset voltage amount, the selected high side driving transistor is being turned on and off according to the PWM signal generated by the PWM one-shot timer circuit 76. The Q output of the RS flip-flop circuit 54 is high and the PWM signal is inverted by the NAND gate 60 and delivered to the motor control logic circuit 62 such that the selected high side driving transistor is turned on and off according to the inverted PWM signal. When the PWM signal is low the selected high side driving transistor is turned on, and when the PWM signal is pulled high the transistor is turned off. When the selected high side driving transistor is turned on the current conducting through the coils gradually increases, and as a result the speed of the motor increases. The speed of the rotor is sensed by sensing the amount of current passing through the coils which is directly proportional to the voltage at the first end I of the sense resistor $R_s$. The speed of the rotor is limited by the PWM signal which turns the selected high side driving transistor off for a selected period of time in response to the amount of current flowing through the coils.

The PWM signal is a constant off time square wave signal which is generated in the following manner. The non-inverting input of the third comparator 74 is connected to the command signal which provides a voltage indicating the maximum speed at which the rotor is intended to rotate. The first end I of the sense resistor $R_s$ is connected to the inverting input of the third comparator 74 such that the voltage on the first end I increases proportionally as the current flow through the coils increases. When the voltage at the first end I equals the command voltage, the output of the third comparator 74 shifts from high to low, and the low signal is applied to the D input and passed to the Q output of the flip-flop circuit 72. The PWM one-shot timer circuit 76 receives the low signal from the flip-flop circuit 72, and pulls the PWM signal high for a selected period of time. The high PWM signal is inverted by the NAND gate 60 and delivered to the motor logic circuit 62 such that the selected high side driving transistor is turned off, thereby cutting off current to the coils and slowing the motor. At the end of the selected period of time the output of the third comparator has shifted to a high voltage because the motor has slowed, and the PWM signal is pulled low by the PWM one-shot timer circuit 76 which results in the high side driving transistor being turned on to force new current through the coils. During a start-up process for the motor the duty cycle of the PWM signal is approximately 90%. As the speed of the motor approaches a maximum the duty cycle reduces to approximately 50%. In an alternative embodiment, a constant duty cycle PWM signal could be employed to control the speed of the motor in an appropriate feedback control system.

The circuit minimizes the effect of voltage spikes in the BEMF signal in the following manner. The first comparator 50 compares the BEMF signal from the $\Phi_{ABC}$ line with the center tap voltage from the CT line and its output is connected to the switch 58. The switch 58 in the sample and hold circuit 52 is enabled by the rising edge of the PWM signal, and the BEGF signal is sampled at the output of the first comparator 50 as the switch 58 is closed. In other words, as the high side driving transistor is being turned off, the sample and hold circuit 52 is enabled such that the switch 58 is closed and the output of the first comparator 50 is relayed from the S input to the Q output of the RS flip-flop circuit 54. As discussed above, when the selected high side driving transistor is turned on in the PWM mode, a transient voltage spike may occur in the coils which could disrupt the BEMF signal in the floating coil. The BEMF zero crossing point is therefore preferably detected when the high side driving transistor has been conducting for a certain amount of time and the transient effects of the voltage spike have dissipated. An error may occur in the detection of the zero crossing point if the detection is made while the disruption of the voltage spike continues to have an effect on the BEMF signal. The train of events in the circuit leading up to the detection of a zero crossing point is delayed until the sample and hold circuit 52 is enabled at an instant when the selected high side driving transistor has been conducting for a substantial period of time.

The circuit detects the zero crossing points in the following manner. For purposes of illustration, the following description will correspond to a situation where the motor is operating in a PWM mode and the slope of the BEMF signal is negative. Therefore, the voltage in the floating coil is higher than the voltage at the center tap and is decreasing toward the center tap voltage. The P/N signal is low. In this situation the $\Phi_{ABC}$ line will be connected to the non-inverting inputs of each of the comparators 50 and 64, and the CT line will be connected to the inverting inputs of both comparators by the switch 66. It will be apparent to those skilled in the art that the operation of the circuit would be the same if the slope of the BEMF signal were positive, the only difference being that the connection of the CT and $\Phi_{ABC}$ lines would be reversed with respect to both of the comparators 50 and 64.

When the BEMF signal is separated from the center tap voltage by more than the offset voltage amount the output of the first comparator 50 is high, and the high signal is passed through to the first input of the NAND gate 60 by the Q output of the RS flip-flop circuit 54. During this period the PWM signal from the PWM one-shot timer circuit 76 is inverted by the NAND gate 60 and then passed to the motor control logic circuit 62, which drives the selected high side driving transistor according to the inverted PWM signal.

As the BEMF signal reaches a voltage which is separated from the center tap voltage by a threshold amount as set on the OFFSET line, the output of the first comparator 50 goes low. When the sample and hold circuit 52 is enabled by the rising edge of the PWM signal, the low signal is passed through the RS flip-flop circuit 54 to the first input of the NAND gate 60. A low input to the NAND gate 60 results in a high output delivered by the NAND gate 60 to the motor control logic circuit 62. The high output signal from the NAND gate 60 overrides the PWM signal and prevents the selected high side driving transistor from shutting off. The high output signal is temporary and forces two operating conditions. First, the steady BEMF signal developed during the preceding period when the inverted PWM signal was high is maintained. Second, the BEMF signal will not be disrupted by a change of state in the selected high side driving transistor. A low signal at the Q output of the RS flip-flop circuit 54 also enables the second comparator 64 through the enabling input port $\overline{EN}$, and the second comparator 64 produces a high signal at its output until the BEMF signal equals the center tap voltage.

In the period before the BEMF signal reaches the offset voltage amount, the Q output of the RS flip-flop circuit 54 is high, and the inverter 68 applies a low signal to the first input of the NAND gate 70, which in turn applies a high signal to the $\overline{CL}$ input of the flip-flop circuit 72. During this period, the D flip-flop circuit 72 relays the output from the third comparator 74 to the input of the PWM one-shot timer circuit 76. When the Q output of the RS flip-flop circuit 54 transitions from high to low, the inverter 68 inverts the low signal and applies a high signal to the first input of the NAND gate 70. The high input enables the NAND gate 70 to invert the output of the second comparator 64 and apply the inverted signal to the $\overline{CL}$ input of the flip-flop circuit 72. In the period before the zero crossing point, the output of the second comparator 64 is high and therefore a low signal is applied to the $\overline{CL}$ input of the flip-flop circuit 72 which forces the Q output of the flip-flop circuit 72 and the input of the PWM one-shot timer circuit 76 low. As long as the input to the PWM one-shot timer circuit 76 is low, the PWM signal is held high which disables the switch 58 and the sample and hold circuit 52. No sampling of the output of the first comparator 50 takes place until after the PWM one-shot timer circuit 76 receives a high input.

At the zero crossing point the output of the second comparator 64 shifts from high to low, and this signal is delivered on the zero crossing signal output line 65 to various well-known circuits for controlling a three-phase DC motor. For example, as discussed above, the zero crossing point is used to derive a commutation point for the motor. The zero crossing point may also be used to analyze the rotational speed of the rotor using known circuitry.

Several other events also occur in the circuit upon the detection of a zero crossing point. First, the second input of the NAND gate 70 is pulled low, and the output of the NAND gate 70 transitions to a high signal which is applied to the $\overline{CL}$ input of the flip-flop circuit 72. The flip-flop circuit 72 then resumes relaying the output of the third comparator 74 to the input of the PWM one-shot timer circuit 76, which begins to produce the PWM signal. The PWM signal is thereafter applied to enable the sample and hold circuit 52 to begin sampling the output of the first comparator 50. The restored PWM signal is also applied to the NAND gate 60. The output of the second comparator 64 is also connected to the $\overline{PS}$ input of the RS flip-flop circuit 54. The $\overline{PS}$ input is a preset input for the RS flip-flop circuit 54 which forces the Q output high when the $\overline{PS}$ input is pulled low. The high signal from the Q output is in turn applied to the NAND gate 60 to enable it to resume inverting the PWM signal, and the selected high side driving transistor resumes its response to the inverted PWM signal. The high signal from the Q output of the RS flip-flop circuit 54 is applied to the $\overline{EN}$ input to disable the second comparator 64 which pulls the output of the second comparator 64 high. The high signal from the Q output of the RS flip-flop circuit 54 is also applied to the input of the inverter 68 which in turn applies a low signal to the first input of the NAND gate 70. The NAND gate 70 thereafter applies a high signal to the $\overline{CL}$ input of the flip-flop circuit 72 until the next point at which the BEMF signal equals the offset voltage amount.

In the next phase of rotation a commutation toggles the P/N signal to cause the switch 66 to reverse the connections between the CT and $\Phi_{ABC}$ lines and the comparators 50 and 64. The output of each of the comparators 50 and 64 is high at this point. The circuit is ready to detect the next zero crossing point.

The threshold value used for the offset voltage amount, which establishes the distance between the point where the output of the first comparator 50 goes low and the zero crossing point as shown in FIGS. 4 and 4A, is selected based on several variables including the size of the motor, the disk drive characteristics, and the typical PWM frequency. The offset voltage amount is chosen as small as possible in order to minimize the amount of time that the PWM signal is overridden. If the offset voltage amount is too large, there is an increased risk of error in detecting of the zero crossing point. Also, the selected high side driving transistor will be maintained in a conducting state for an excessive period of time. If the offset voltage amount is too small, then the second comparator 64 will not be enabled in time to detect the zero crossing point and, as a result, some zero crossing points may be missed.

The circuits described according to the embodiments of the invention detect zero crossing points accurately and consistently for a motor operated in the PWM mode. Each circuit eliminates errors prevalent in known methods by using a first detection point as a flag to indicate the approaching zero crossing point, and by maintaining the selected high side driving transistor in a conducting state until the zero crossing point is detected. In this way the circuits consistently detect every zero crossing point. The method and the circuits according to the embodiments of the invention may be used to detect zero crossing points for a motor operated in the linear mode, but are especially adapted for a motor operated in a PWM mode.

A method and circuits for detecting the zero crossing points in a BEMF signal have been described. In the preceding description, specific details were set forth, such as a specific arrangement of comparator circuits, flip-flop circuits, and the use of a PWM one-shot timer circuit, in order to provide a thorough understanding of embodiments of the present invention. It will be apparent, however, to one skilled in the art that the present invention may be practiced without these details. In other instances, well-known circuits such as a motor control logic circuit, a sequencer circuit, and a phase lock loop circuit have not been shown in detail in order not to unnecessarily obscure the invention.

It will also be appreciated that, although various embodiments of the invention have been described above for purposes of illustration, various modifications may be made without deviating from the spirit and scope of the invention. For example, the present invention has been described as using a first comparator to produce a first signal when the BEMF signal equals an offset voltage amount and a second comparator to detect when the BEMF signal equals the center tap voltage. However, those skilled in the art will appreciate that the present invention could be practiced with alternative circuitry for detecting a BEMF signal offset point and the zero crossing point. Also, the present invention has been described in relation to a three-phase DC motor being operated in a sequence of six phases. The present invention is equally applicable to a three-phase DC motor being operated in a sequence of three phases rather than six phases. Numerous variations are well within the scope of this invention. Accordingly, the invention is not limited except as by the appended claims.

I claim:

1. A circuit for controlling a polyphase DC motor, comprising:

an offset detection circuit having an output and generating a first signal at its output when the difference between a BEMF signal and a center tap voltage is less than an offset voltage amount;

a zero crossing detection circuit having an output and generating a zero crossing signal when the BEMF signal equals the center tap voltage; and a logic circuit driving a selected high side driving transistor with a PWM signal, the logic circuit overriding the PWM signal and driving the selected high side driving transistor to a conducting state in response to the generation of the first signal, the logic circuit returning to drive the selected high side driving transistor with the PWM signal in response to the generation of the zero crossing signal.

2. The circuit of claim 1 wherein the offset detection circuit comprises:

a first comparator having a first inverting input, a first non-inverting input, an offset signal input terminal receiving a programmable offset signal, and an output, the first inverting input being selectively connectable to the center tap voltage or the BEMF signal and the first non-inverting input being connectable to the other of the BEMF signal or the center tap voltage, whichever is not connected to the first inverting input, the first comparator generating the first signal at its output.

3. The circuit of claim 1 wherein the zero crossing detection circuit comprises:

a second comparator having a second inverting input, a second non-inverting input, an enabling input being coupled to the output of the offset detection circuit, and an output, the second inverting input being selectively connectable to the center tap voltage or the BEMF signal and the second non-inverting input being connectable to the other of the BEMF signal or the center tap voltage, whichever is not connected to the second inverting input, the second comparator generating the zero crossing signal at its output.

4. The circuit of claim 1 wherein the logic circuit is comprised of:

a timer circuit having an output and generating a square wave PWM signal having a duty cycle at its output;

a motor control logic circuit having an input and being coupled to a plurality of high side driving transistors in the motor, the motor control logic circuit driving a selected high side driving transistor in response to a signal delivered to its input;

an inverter circuit having a first input, a second input coupled to the output of the timer circuit, and an output connected to the input of the motor control logic circuit, the inverter circuit inverting the PWM signal and delivering the inverted PWM signal to the input of the motor control logic circuit; and a sample and hold circuit having an input connected to the output of the offset detection circuit, an enabling input terminal connected to the output of the timer circuit to receive the PWM signal, a setting input connected to the output of the zero crossing detection circuit, and an output connected to the first input of the inverter circuit, the sample and hold circuit receiving and holding the first signal at a rising edge of the PWM signal, the sample and hold circuit generating an override signal to disable the inverter circuit and to transmit a high signal to the input of the motor control logic circuit in response to the generation of the first signal, the sample and hold circuit ceasing the generation of the override signal in response to the generation of the zero crossing signal.

5. The circuit of claim 1, further comprising a timer circuit generating a PWM signal, the PWM signal being coupled to the logic circuit.

6. The circuit of claim 5, further comprising:

a third comparing circuit having a first input being connected to a sense resistor coupled to the DC motor, a second input receiving a command signal, and an output coupled to an input of the timer circuit, the third comparing circuit generating a third signal at its output when a voltage drop across the sense resistor is greater than the command signal, the timer circuit pulling the PWM signal high for a selected period of time in response to the generation of the third signal.

7. A circuit for detecting a zero crossing point in a BEMF signal, comprising:

a first comparing circuit having a first input, a second input, an output, and receiving an offset signal equal to a selected offset voltage amount, the first input being connected to a center tap voltage, the second input being connected to a BEMF signal, a first signal being generated at the output of the first comparing circuit when the difference between the BEMF signal and the center tap voltage is less than the selected offset voltage amount; and a second comparing circuit having a third input, a fourth input, an output, and an enabling input connected to the output of the first comparing circuit such that the second comparing circuit is enabled when the first signal is generated, the third input being connected to the center tap voltage and the fourth input being connected to the BEMF signal such that the second comparing circuit generates a zero crossing signal at its output when the BEMF signal equals the center tap voltage.

8. A method for controlling a polyphase DC motor having a plurality of coils, comprising the steps of:

directing a current through two of the coils and allowing one of the coils to float;

sensing a BEMF signal in the floating coil;

sensing a center tap voltage;

comparing the BEMF signal with the center tap voltage;

generating a first signal when the difference between the BEMF signal and the center tap voltage is less than a selected offset voltage amount;

generating an override signal to drive a selected high side driving transistor in the DC motor to a conducting state;

comparing the BEMF signal with the center tap voltage;

generating a zero crossing signal when the BEMF signal equals the center tap voltage;

ceasing the generation of the override signal; and generating a commutation signal, the commutation signal being delayed from the generation of the zero crossing signal by a selected period.

9. The method of claim 8, further comprising the steps of:

sensing a slope of the BEMF signal; and generating a digital slope signal representing the slope of the BEMF signal.

10. The method of claim 9 wherein each of the steps of comparing the BEMF signal with the center tap voltage comprises the steps of:

selectively connecting the BEMF signal to one of an inverting input and a non-inverting input of a comparator;

connecting the center tap voltage to one of the inverting input and the non-inverting input of the comparator not connected to the BEMF signal; and reversing the connections of the BEMF signal and the center tap voltage with the inputs of the comparator when the digital slope signal changes such that an output signal of the comparator switches from high to low.

11. The method of claim 8, further comprising the steps of:

generating a PWM signal from a timer circuit;

inverting the PWM signal to generate an inverted PWM signal;

driving the selected high side driving transistor of the DC motor with the inverted PWM signal;

driving the selected high side driving transistor to a conducting state with the override signal in response to the generation of the first signal; and driving the selected high side driving transistor with the inverted PWM signal in response to the generation of the zero crossing signal.

12. The method of claim 11, further comprising the step of delaying the generation of the first signal until the instant the PWM signal switches the selected high side driving transistor off.

13. The method of claim 11 wherein the step of generating the PWM signal comprises the steps of:

generating a low PWM signal;

sensing a current flow through the DC motor;

comparing the current flow with a command value;

generating a high PWM signal for a selected period of time when the current flow exceeds the command value; and generating a low PWM signal when the selected period ends.

14. A method for detecting a BEMF zero crossing point for a polyphase DC motor, comprising the steps of:

sensing a BEMF signal in a floating coil of the motor;

sensing a center tap voltage;

generating a first signal when the difference between the BEMF signal and the center tap voltage is less than a selected offset voltage amount;

generating an override signal to drive a selected high side driving transistor to a conducting state; and generating a zero crossing signal when the BEMF signal equals the center tap voltage.

* * * * *